United States Patent [19]

Wagner et al.

[11] Patent Number: 4,892,027
[45] Date of Patent: Jan. 9, 1990

[54] VACUUM BRAKE POWER BOOSTER FOR AUTOMOTIVE VEHICLES AND METHOD FOR ITS MANUFACTURE

[75] Inventors: Wilfried Wagner, Huettenberg-Weidenhausen; Lothar Schiel, Hofheim-Lorsbach, both of Fed. Rep. of Germany

[73] Assignee: Alfred Teves GmbH, Frankfurt am Main, Fed. Rep. of Germany

[21] Appl. No.: 165,327

[22] Filed: Mar. 8, 1988

[30] Foreign Application Priority Data

Mar. 20, 1987 [DE] Fed. Rep. of Germany ....... 3709172

[51] Int. Cl.4 ................................................ F15B 9/10
[52] U.S. Cl. .............................. 91/369.2; 91/376 R; 92/165 R
[58] Field of Search .................... 91/369.2, 376 R; 92/165 R

[56] References Cited

U.S. PATENT DOCUMENTS

| 4,072,014 | 2/1978 | Gardner | 91/369.2 X |
| 4,632,014 | 12/1986 | Endo | 91/369.2 |
| 4,641,568 | 2/1987 | Boehm et al. | 91/369.2 |
| 4,643,075 | 2/1987 | Wagner | 91/369.2 |

FOREIGN PATENT DOCUMENTS

| 666181 | 7/1963 | Canada | 91/369.2 |
| 3402962 | 8/1985 | Fed. Rep. of Germany | 91/369.2 |
| 202146 | 11/1983 | Japan | 91/369.2 |
| 2081403 | 2/1982 | United Kingdom | 91/369.2 |
| 8505601 | 12/1985 | World Int. Prop. O. | 91/369.2 |

Primary Examiner—Robert E. Garrett
Assistant Examiner—Mary A. Williamson
Attorney, Agent, or Firm—Robert P. Seitter

[57] ABSTRACT

A vacuum brake power booster and method of manufacture is disclosed. The booster includes a guide sleeve in a bore in the control valve casing. A radial flange of the guide sleeve guides the push rod and is supported axially within the axial bore of the control valve casing. The guide sleeve is axially embraced by a retaining member in positive engagement therewith with the retaining member being positively connected to the control valve casing.

8 Claims, 3 Drawing Sheets

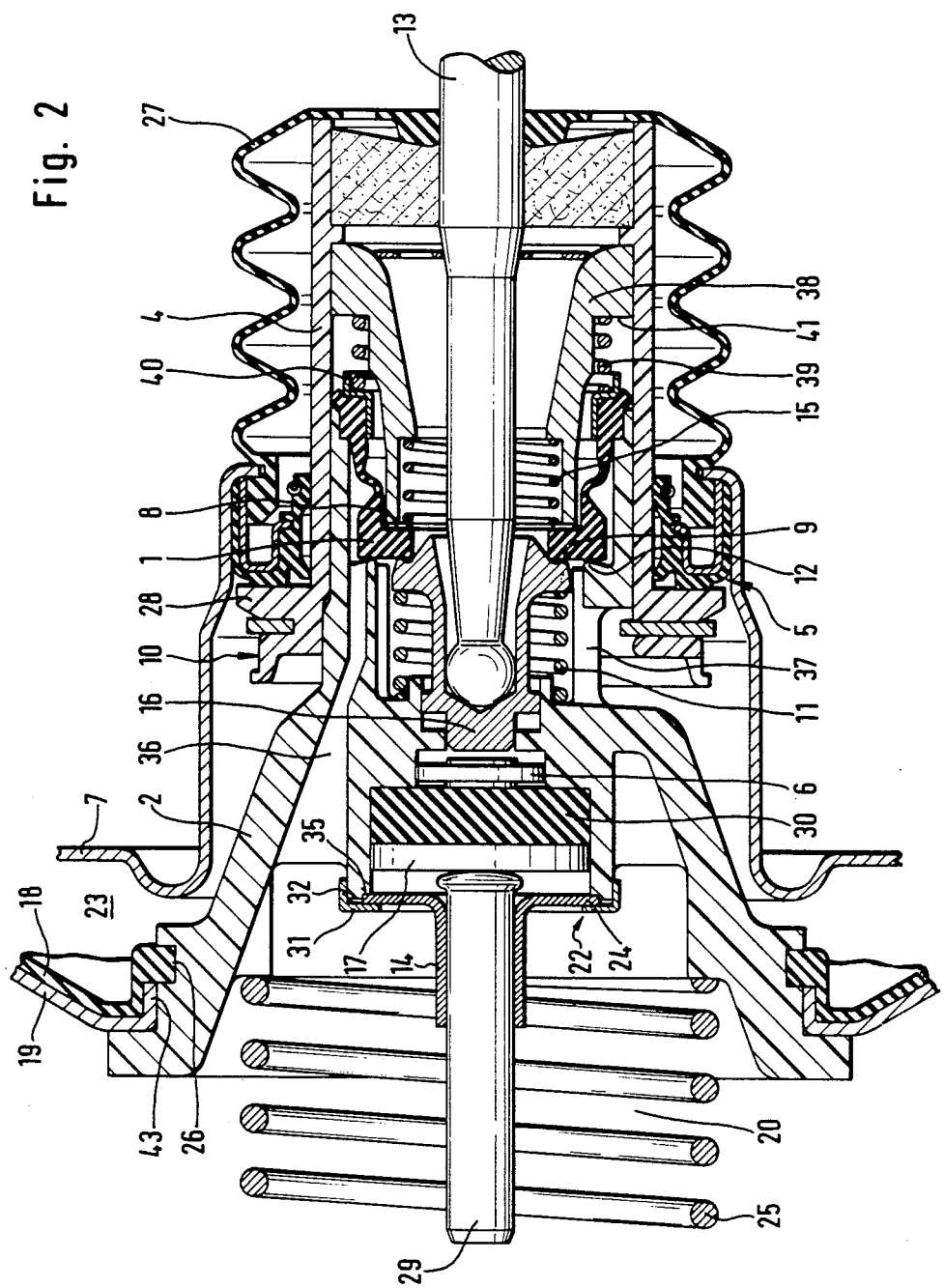

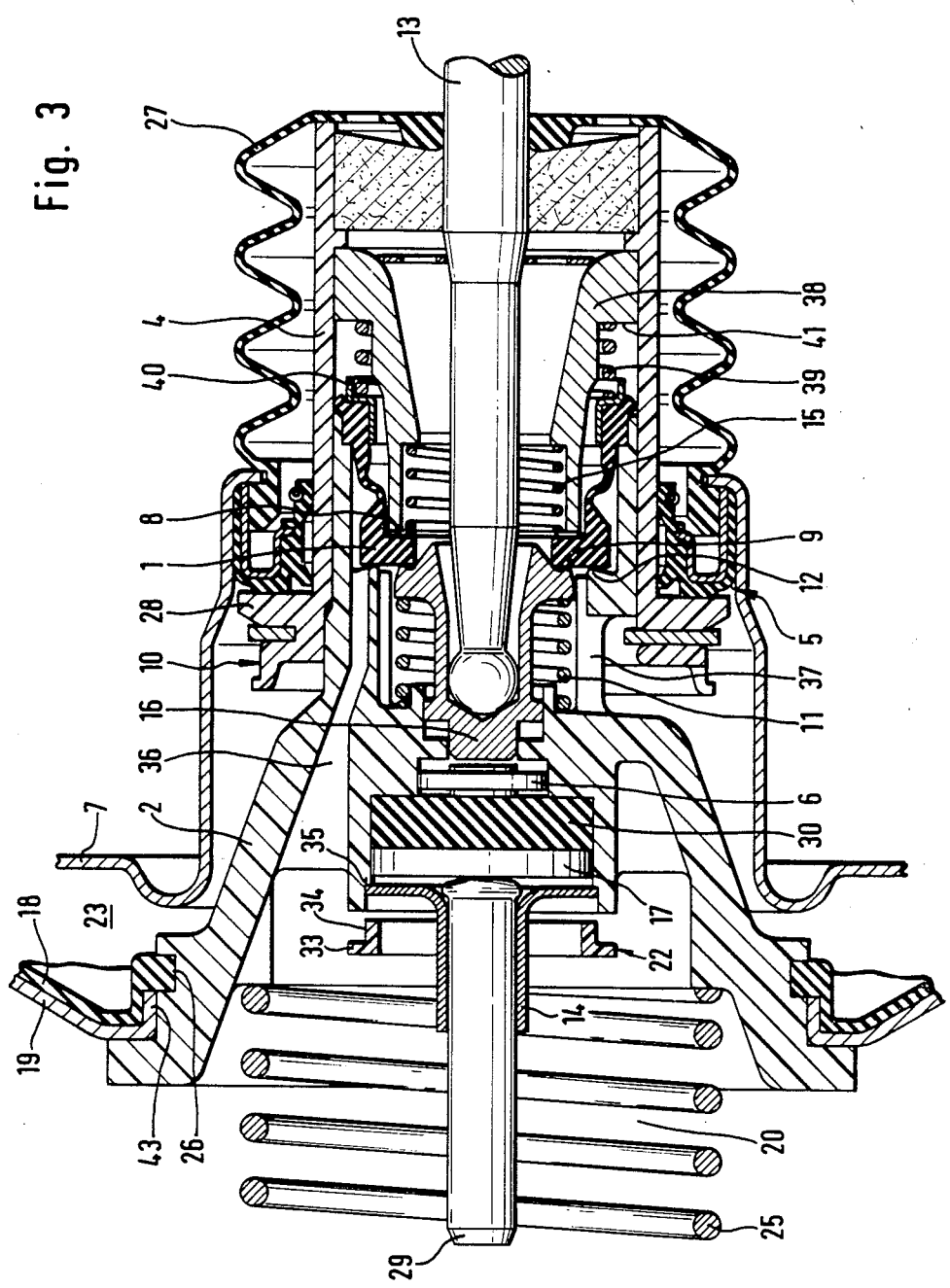

VACUUM BRAKE POWER BOOSTER FOR AUTOMOTIVE VEHICLES AND METHOD FOR ITS MANUFACTURE

BACKGROUND OF THE INVENTION

The present invention relates to a vacuum brake power booster for automotive vehicles of the type having a vacuum casing which is sealingly subdivided by an axially movable wall into a vacuum chamber and a working chamber, and a mechanically actuatable control valve connecting the working chamber to the vacuum chamber and/or to the atmosphere. The axially movable control valve casing is made of thermoplastics and accommodates in an axial bore an elastomeric reaction plate which abuts on a head flange of a push rod for transmitting the brake force onto an actuating piston of a master cylinder that is mounted to the vacuum casing on its vacuum side. The movable wall is coupled to the control valve casing and a guide sleeve serves to axially guide the push rod. The sleeve includes a radial flange. The invention further relates to a method for manufacturing such a vacuum brake power booster.

A vacuum brake power booster of this type is disclosed in applicant's German application No. P 33 44 110.3. In that brake power booster, a pressure plate is arranged between the reaction plate and the push rod. and a guide plate is incorporated in a recess of the control valve casing or in a clamping sleeve connected to the control valve casing. The guide plate has a central bore and its radially internal rim is shaped to form a neck or collar which extends axially in the direction of the master cylinder and serves to hold and guide the push rod, whose end or head portion close to the control casing cooperates with the pressure plate.

A shortcoming in this brake power booster is the way the guide plate is fastened to and/or axially secured at the control valve casing. In particular there must be a metal part in which indentations are provided to retain the guide plate on an end surface of the control valve casing. The part is formed by an axial neck of a diaphragm plate which, together with a rolling diaphragm, is fastened to the control valve casing. This arrangement does not form a particularly good weight-saving design for a vacuum brake power booster in which diaphragm plates of aluminum are used. In view of cracks that can occur during deep-drawing of the aluminum, a separate part made of a metal of better deep-drawing quality must be used. The consequence thereof is a two-part design of the diaphragm plate entailing higher costs. Another shortcoming is found in the mounting of the guide plate which can be done in the axial and in the radial directions. Also shaping of the control valve casing and the channels therein is restricted.

SUMMARY OF THE INVENTION

It is, therefore, the object of the present invention to provide a vacuum brake power booster of the type referred to which largely avoids the above-mentioned shortcomings and which allows more freedom in shaping the movable wall as well as allowing the vacuum channels to be designed in a fashion that is more favorable in regard to flow.

This object is achieved by the present invention in that the radial flange of the guide sleeve is axially supported within the bore of the control valve casing and is axially embraced by a retaining member in positive engagement therewith. The retaining member is in connection with the control valve casing.

Thus, a vacuum brake power booster for automotive vehicles is provided for which is considerably simpler to assemble and uses more cost-efficient component parts than present boosters. Advantageously, the inventive design of the brake power booster provides for excellent centering of the push rod as well as the transmission of maximum retaining forces.

When using thermoplastics which are less suitable for shaping, yet lend themselves to ease of welding, a favorable aspect of the invention provides that the retaining member be formed by a retaining ring whose radially inwardly or outwardly disposed surface is operatively connected with the surface of the control valve casing and/or the wall of the bore of &he control valve casing accommodating the reaction plate. The basic material of the retaining ring corresponds to that of the control valve casing. This advantageously provides greater stability of the coupling between push rod and control valve casing which is particularly important in brake units of larger diameter.

In order to allow the use of smaller-diameter reaction plates while subjected to the same brake forces, another feature of the invention provides for the axial support of the radial flange of the guide sleeve to take place at a bowl-shaped metal insert member which receives the reaction plate. This feature effectively protects the plastic control valve casing against the high pressures in the reaction plate and permits a closer fit between the bowl-shaped insert member made of metal and the pressure plate of the push rod as well as the transmission plate interposed between the control valve piston and the reaction plate.

BRIEF DESCRIPTION OF THE DRAWING

Further details and advantages of the inventive vacuum brake power booster will be appreciated from the following Detailed Description of the Preferred Embodiment of the invention with reference to the accompanying drawings, wherein:

FIG. 2 is a partial longitudinal cross-sectional view of a second embodiment of the vacuum brake power booster according to the invention showing details of construction; and FIG. 3 is a partial longitudinal cross-sectional view of a third embodiment of the vacuum brake power booster according to the invention showing details of construction.

DETAILED DESCRIPTION OF A PREFERRED EMBODIMENT

Figure 1:
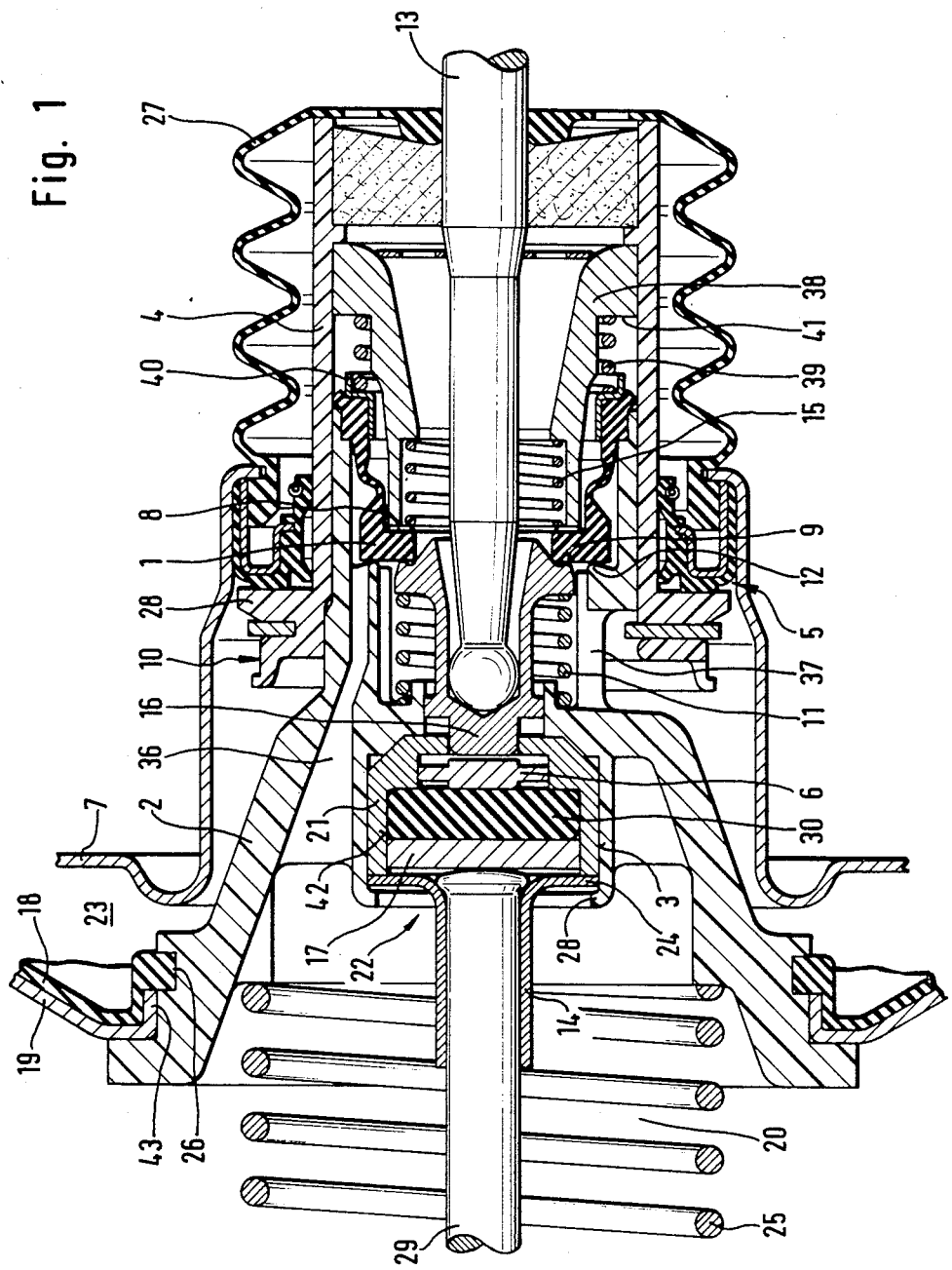
FIG. 1 is a partial longitudinal cross-sectional view of a first embodiment of the vacuum brake power boster according to the invention showing details of construction.

Referring to FIG. 1, the housing of the brake power booster is composed of two housing parts which are coupled by means of indentations at a connecting point. For the sake of clarity, only the housing part 7 on the brake pedal side has been partially illustrated. The housing's interior is subdivided by a booster piston 19 into a vacuum chamber 20 which communicates through a connecting bore with a vacuum source (not shown in more detail) and a working chamber 23. A rolling diaphragm 1B abuts against the booster piston 19 in the working chamber 23 and a two-part control valve casing 10 is connected to the booster piston 19 and rolling diaphragm 18. The rolling diaphragm 18 is pressure-tightly clamped to the casing 10 at the connecting point 26 and embraces with its inward portion the inner rim of booster piston 19 and seals the piston to the control valve casing 10. With its cylindrical guide portion 4, the control valve casing 10 projects from the booster casing 7 and is protected against contamination of its surface by means of a pleated bellows 27. The control valve casing 10 seals the working chamber 23 from the outside by means of a slide ring 5.

In the interior of the control valve casing 10, there is a control rod composed of a piston rod 13 and a valve piston 16 which is axially slidably arranged in the casing. The control rod is adapted to be connected to a brake pedal of an automotive vehicle by way of a fork head, not shown in more detail. Further, the control valve casing 10 contains a valve assembly 1, 9, 12 which is actuated by the valve piston 16 and which controls the difference of pressure between the vacuum chamber 20 and the working chamber 23 through the channels 36, 37. The front part 2 of the control valve casing 10 is arranged in the vacuum chamber 20 and includes a bore 3, and a reaction plate 30. A push rod 29 actuates a brake master cylinder, not shown in more detail, which is secured to the end of the booster housing.

To reset the booster piston 19, a resetting spring 25 is disposed between the front part 2 of control valve casing 10 and the end of the booster housing.

The control assembly unit of the vacuum brake power booster is illustrated in its release position that is, in a position in which the two chambers 20, 23 are isolated. Namely, in this position, the two sealing seats 9, 12 bear against the sealing surface of a poppet valve 1 which, on its side remote from the sealing surface, includes a stop B which, by way of a sleeve 3B, abuts against the guide part 4. In the release position, the guide part 4 abuts with its collar 2B on the slide ring 5, while the sealing seat 9 on control valve piston 16 is pressed by a piston-rod resetting spring 11 against the sealing surface of poppet valve 1. At the same time, the poppet valve 1 is biased in the direction of the two sealing seats 9, 12 by means of a compression spring 15 which latter is supported on one end against the sleeve 38. Also, a second compression spring 39 which is supported on a guide 40 of the poppet valve 1, on the one hand, and on an annular surface 41 of the sleeve 3B, on the other hand, keeps the two control valve casing parts 2, 4 apart.

In order to attain an exact guidance of the push rod 29, a guide sleeve 14 is provided having a radial flange 24 inserted into the bore 3 of the front part 2 and which takes axial support on a bowl-shaped metal insert member 21 which is provided with an axial stepped bore 42. Reaction plate 30 is disposed in a portion of the stepped bore 42 facing the vacuum chamber 20, and a pressure plate 17 is provided between the reaction plate 30 and the end of push rod 29 close to the control casing. Arranged in a second portion of the stepped bore 42 of smaller diameter is a transmission plate 6 which cooperates with the control valve piston 16 and whose surface that is in contact with &he reaction plate 30 determines the transmission ratio of the brake unit. The push rod 2g and guide sleeve 14 are axially retained by a retaining member 22 which is in positive engagement with the radial flange 24 of guide sleeve 14. In the embodiment illustrated, the retaining member 22 is formed by a radial collar 2B which is shaped integrally with the control valve casing front part 2 by the plastic deformation. The collar 2B axially embraces the flange 24.

In the embodiments of the invention shown in FIGS. 2 and 3, which are particularly adapted for larger devices, a retaining ring 31 and 33, respectively, is used for axially securing the guide sleeve 14 axially in position. The radial flange 24 of the guide sleeve 14 takes support on a step-like projection 35 of the bore 3. FIG. 2 shows the retaining ring 31 having a radially inwardly disposed surface 32 welded or glued to the surface of the control valve casing 10 and FIG. 3 shows the retaining ring 33, having a radially outwardly disposed surface 34 operatively connected to the wall of the bore 3 such as by being welded or glued thereto.

The use of a separate retaining ring considerably increases the stability of the connection between the control valve casing and the push rod so that maximum retaining forces can be transmitted.

What is claimed is:

1. A vacuum brake power booster for automotive vehicles comprising a vacuum Casing which is sealingly subdivided by an axially movable wall into a vacuum chamber and a working chamber a mechanically actuatable control valve connecting the working chamber to the vacuum chamber and to atmosphere, the axially movable control valve having a casing being made of thermoplastics and accommodating in an axial bore therein an elastomeric reaction plate, said reaction plate abuts on a head flange of a push rod adapted to transmit a brake force onto an actuating piston of a master cylinder mountable onto the vacuum casing, the movable wall being coupled to the control valve casing, a guide sleeve on said control valve casing adapted to axially guide the push rod therein said guide sleeve includes a radial flange wherein the radial flange of the guide sleeve is axially supported inside the bore of the control valve casing accommodating the reaction plate and said guide sleeve axially embraced by a retaining member in positive engagement with said guide sleeve, said retaining member being connected to the control valve casing.

2. The vacuum brake power booster as claimed in claim 1 wherein the retaining member defines a radial collar integrally shaped at the control valve casing.

3. The vacuum brake power booster as claimed in claim 1 wherein the retaining member defines a plurality of radially inwardly directed projections which are shaped integrally at the control valve housing.

4. The vacuum brake power booster as claimed in claim 1 wherein the retaining member defines a retaining ring having a radially inwardly disposed surface operatively connected with a surface of the control valve casing.

5. The vacuum brake power booster as claimed in claim 4 wherein the material of the retaining ring corresponds to that of the control valve casing.

6. The vacuum brake power booster as claimed in claim 1 wherein the retaining member defines a retaining ring having a radially outwardly disposed surface operatively Connected with a surface of the control valve casing.

7. The vacuum brake power booster as claimed in claim 1 wherein the axial support of the radial flange of the guide sleeve is effected at a bowl-shaped insert member in the bore in the control valve casing, said insert member receiving the reaction plate.

8. The vacuum brake power booster as claimed in claim 1 wherein the bore receiving the reaction plate includes a step-shaped projection on which the radial flange is axially supported.

* * * * *